(12) United States Patent
Moore et al.

(10) Patent No.: US 8,837,701 B1
(45) Date of Patent: *Sep. 16, 2014

(54) CONFERENCE CALL INFORMATION SHARING VIA INTERACTION WITH SOCIAL NETWORKING DATA

(71) Applicant: West Corporation, Omaha, NE (US)

(72) Inventors: Michael J. Moore, Omaha, NE (US); Bruce Pollock, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,982

(22) Filed: Oct. 29, 2013

Related U.S. Application Data

(63) Continuation of application No. 13/452,304, filed on Apr. 20, 2012, now Pat. No. 8,594,292.

(51) Int. Cl.
*H04M 3/42* (2006.01)
*G06F 15/16* (2006.01)
*G06F 15/167* (2006.01)
*H04M 3/56* (2006.01)

(52) U.S. Cl.
CPC .................................. *H04M 3/567* (2013.01)
USPC ............ 379/202.01; 379/201.01; 379/204.01; 455/416; 709/204; 709/213

(58) Field of Classification Search
CPC ............ H04M 2203/655; H04M 3/56; H04M 2201/40; H04M 2201/42; H04L 12/1822; H04L 12/1831; H04L 12/1818
USPC ............ 379/202.01, 201.01, 203.01, 204.01; 715/739, 757; 709/213, 214, 215, 216, 709/204; 455/416
See application file for complete search history.

(56) References Cited

U.S. PATENT DOCUMENTS

2011/0072366 A1\* 3/2011 Spencer et al. ................ 715/757
2011/0271197 A1\* 11/2011 Jones et al. .................... 715/739

\* cited by examiner

*Primary Examiner* — Thjuan K Addy

(57) ABSTRACT

Examples of associating user information from social network sites with a conference call application may include a series of operations. One example operation may provide receiving a command to share at least one social networking application with a scheduled conference call and accessing an application programming interface (API) of the social networking application, and sharing user profile information with a graphical user interface (GUI) application of the scheduled conference call corresponding to the command to share the social networking application.

20 Claims, 7 Drawing Sheets

CONFERENCE CALL INFORMATION SHARING VIA INTERACTION WITH SOCIAL NETWORKING DATA

CROSS-REFERENCE TO RELATED APPLICATIONS

This application is a continuation from U.S. patent application Ser. No. 13/452,304, filed Apr. 20, 2012, and entitled "CONFERENCE CALL INFORMATION SHARING VIA INTERACTION WITH SOCIAL NETWORKING DATA", which is incorporated by reference herein in its entirety.

TECHNICAL FIELD OF THE INVENTION

This invention relates to a method and apparatus of sharing user information with conference call participants during live conference call sessions, and more particularly, to sharing certain information through pre-registered user information sources, such as social networking websites.

BACKGROUND OF THE INVENTION

End users who participate in audio/video teleconferencing and conference calls today do not have access to any contextual information about the various different people with whom they are speaking. Examples of contextual information may include the individuals' business roles, relevant social characteristics, likes and dislikes and just plain background information that may assist others with relating to such persons during a conversation that is already not being conducted face-to-face. Other examples of individual contextual information may include everyday synergies, such as favorite sports teams, personal preferences, school alumni associations, prior employment history (companies), etc.

Currently, there is no easy way for people to share certain personal information in real-time and within the context of a live phone conference. Additionally, there is no present application that allows a user to designate what information is shared with others in the context of a particular conference call. For example, a book of the month club may hold conference calls that encourage users to share more interests with others for the purpose of making friends and sharing interests. In another example, a user participating in a business meeting may only wish to share certain professional credentials and only one portion of personal information in an effort to appear professional at all times. Regardless of the purpose of the meeting, conference calls and related social meetings should provide users with seamless access to their personal information and corresponding information sharing applications.

SUMMARY OF THE INVENTION

One embodiment of the present invention may include a method that provides receiving user credentials to access a user account, authenticating the user credentials and permitting access to the user account and receiving at least one command to share at least one social networking application with a scheduled conference call. The method may further include accessing an application programming interface (API) of the at least one social networking application and sharing user profile information with a graphical user interface (GUI) application of the scheduled conference call corresponding to the at least one command to share the at least one social networking application.

Another example embodiment of the present invention may include an apparatus that provides a receiver configured to receive user credentials to access a user account, and a processor configured to authenticate the user credentials and permitting access to the user account and receive at least one command to share at least one social networking application with a scheduled conference call. The processor is further configured to access an application programming interface (API) of the at least one social networking application and sharing user profile information with a graphical user interface (GUI) application of the scheduled conference call corresponding to the at least one command to share the at least one social networking application.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Figure 1:
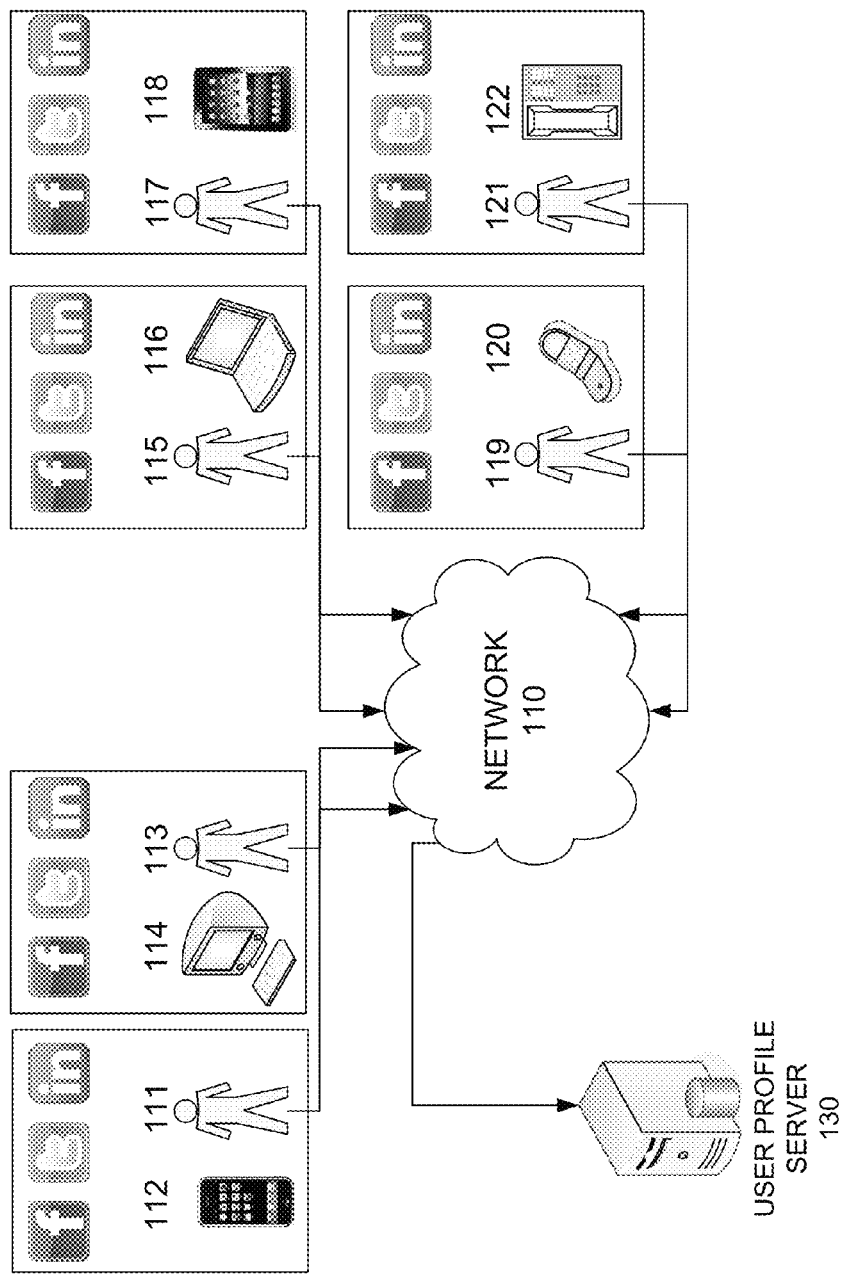
FIG. 1 illustrates an example conference call system diagram of multiple users participating in a live conference call, according to example embodiments.

FIG. 1 illustrates an example conference call system diagram 100 with multiple users participating in a live conference call, according to example embodiments. Referring to FIG. 1, multiple end users 111, 113, 115, 117, 119 and 121 are paired with corresponding communication devices, such as a smartphone 112, personal computer (PC) 114, laptop computer 116, tablet computing device 118, cellular phone 120 and landline phone 122. However, any such communication device may be used to connect to an active conference call over a communication network 110. The communication network 110 may include a public switched telephone network (PSTN), a cellular communication network, the Internet, local and wide area networks, and may support telephony and IP-based communication signaling. In addition, the conference call participant devices may be any of a computer, laptop, mobile, wireless or cellular phone, a PDA, a tablet, a client a server or any device that contains a processor and/or memory, whether that processor or memory performs a function related to an embodiment of the invention.

In operation, the communication network 110 of FIG. 1 processes call setup and call maintenance procedures, which are used to setup and maintain a conference call leg for each individual call participant 111-121. The communication link(s) may include transferring real-time voice and/or video data information over communication links, such as wireless networks (e.g., GSM, CDMA, 3G, 4G, etc.), wireline networks (e.g., landline telephony), Internet, satellite/cable networks, or any other data medium using standard communication protocols.

Referring to FIG. 1, each of the participants may be invited to participate in a conference that is setup by one particular moderator (for example purposes it is assumed that participant 121 is the moderator). Each of the participants may receive a text message (SMS), email or other invitation message to join the conference call at a particular time as part of a conference call application program. When the participants dial-in or connect to the conference call and are placed in a virtual lobby or waiting status, the moderator 121 may be responsible for beginning the session, which allows each of the participants to begin hearing, speaking and/or viewing one another for the duration of the call.

The participants may be pre-enrolled or setup with a profile with one or more of the commonly known social networking websites (e.g., Facebook®, Twitter®, LinkedIn®, etc.). For example, some users may utilize dozens of social networking websites while others may only have their information prepared with one social networking website. According to one example embodiment, the conference call participants may enroll in a conference call user profile service that combines user profile information from the social networking websites into a common information source that is utilized by the conference call system of the present application.

Example embodiments provide the conference call participants with the opportunity to view social profiles of the call participants prior to, during and after a specific conference call. Additionally, the participants may be afforded the opportunity to screen or filter some or all portions of their various social profiles and related information so that fellow participants can only view the selected portions of their profile.

According to one example, a participant may wish to share only certain portions of their personal information with the conference call sessions by effectively limiting the amount of information viewable by others. For example, a user may wish to share certain background information during a conference call, such as education, job, address, etc., while not sharing personal blog entries, comments, pictures, tweets, etc. The user profile server 130 may enable limiting variables aimed at reducing the user's shared content via user enabled filters setup through the conference call management system of the present application. Example filters may include YES-[personal information], NO-[blog data], NO-[live feeds], NO-[image data], etc. In this example, the user's personal information entered during setup and which is linked to the user's profile information may be shared while any other types of data associated with the user's social networking profile may be prevented from being shared. The filtering may be performed at the user profile server 130 as part of the conference call application.

The conference call system and related application may provide the capability to remember user preferences, for example, for a regular weekly call with the same participants a default option may be to only share profile information. However, certain users may wish to share blog entries and other information with other call participants to bring more discussion topics together and to provide weekly updates ahead of time without having to speak or introduce the content for the first time during the call.

The information sharing application may default to the social profile options that the specific participant(s) selects most often (e.g., what the participant views of other peoples' profiles and/or what the user shares of their own initiative). The information sharing application may also alert the conference call participant(s)/moderator if another participant has commented specifically about them or their company in a public context (twitter, facebook, blog entry, etc.). A conference call participant may setup audit filters to search for such information of interest "ACME" corporation and have each of the participants' social network information sources scanned, parsed and shared instantly during the conference call session via a live dashboard environment.

Figure 2:
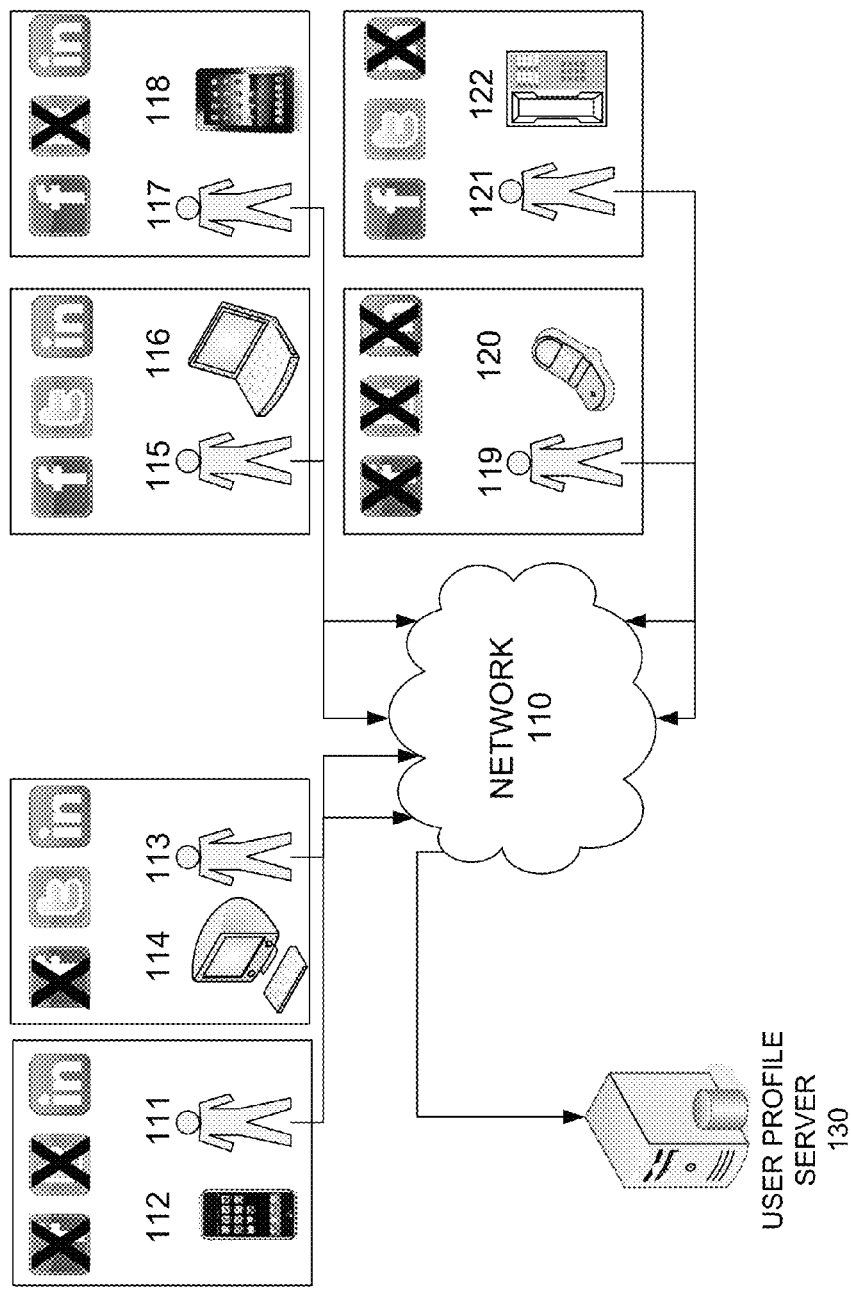
FIG. 2 illustrates an example conference call system diagram of multiple users participating in a live conference call and limiting their shared user profile and social networking information, according to example embodiments.

FIG. 2 illustrates an example conference call system diagram of multiple users participating in a live conference call and limiting their shared user profile and social networking information, according to example embodiments. Referring to FIG. 2, certain users may have elected to have certain social networking applications limited or eliminated from the conference call information sharing session. For example, participant 111 has only elected to share information from his LinkedIn profile, while participant 113 has only eliminated facebook entries from being shared. Participant 115 has not eliminated any social networking information sources from being shared and may regret the decision later on. Participant 117 has only eliminated twitter account information from being shared, participant 121 has only eliminated LinkedIn information and participant 119 has eliminated all account information from being shared. Each of the participants may enable security sharing information within each individual account or specifically within the conference call application according to example embodiments.

Resource description framework (RDF) site summary/really simple site summary (RSS) feeds may be incorporated into a user's conference call information sharing profile. In general, RSS is a consortium of web feed formats used to publish frequently updated works, such as blog entries, news headlines, audio, and video into a standardized format. An RSS document or "feed"/"web feed"/"channel" includes full or summarized text, plus metadata such as publishing dates and authorship.

A standardized XML file format allows the information to be published once and viewed by many different programs and applications. RSS feeds can be read using a standard "RSS reader", which may be web-based, desktop-based, or mobile-device-based. Normally, a user would subscribe to a feed by entering into the reader interface the feed's URI or by clicking a feed icon in a web browser that initiates the subscription process. The RSS reader checks the user's subscribed feeds regularly for new work, downloads any updates, and provides a user interface to monitor and read the feeds. RSS feeds allow users to avoid manually inspecting all of the websites and user information sources of interest, and instead subscribe to such source such that all new content is pushed onto their browsers when it becomes available. In the conference call application of the present invention, a RSS feed may be initiated and provided as a shared information source for a particular user.

According to one example, a moderator may initiate the sharing of information by setting a default information sharing filter that allows access to all shared information and related applications as authorized by each participant and their corresponding user account. The individual participants may be required to change the shared information profile before or during a conference call in order to privatize such information. Alternatively, participants may elect certain filters to pull feeds or entries on a blog or information sharing website to avoid any unwanted information sharing. For example, prior to a conference call, one participant may set a filter to remove all entries and related submissions that are combined with the word "ACME." Such an active filtering operation may ensure that the user's posts and previously stored information sources eliminate the term "ACME" so as not to form an opinion about the corporation one or more of the participants is currently employed.

Figure 3A:
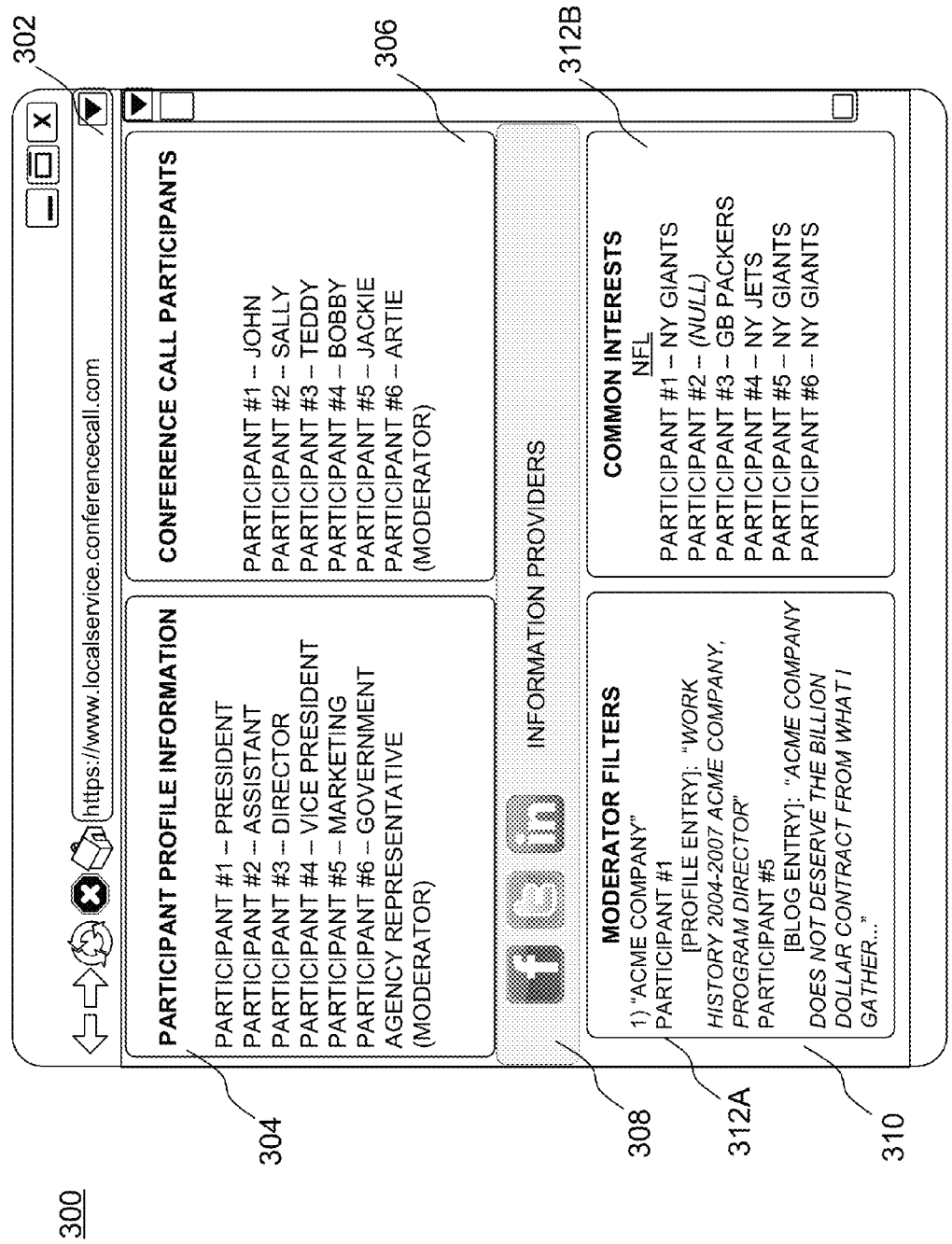
FIG. 3A illustrates an example graphical user interface (GUI) that illustrates a conference call participant's view of a conference call participant information sharing application, according to example embodiments.

FIG. 3A illustrates an example graphical user interface (GUI) that illustrates a conference call participant's view of a conference call participant information sharing application, according to example embodiments. Referring to FIG. 3A, the GUI 300 provides a detailed view of the conference call participants in a web application interface 302. A web address 302 may be present in a browser window that is used as a portal to view the active participation of the participants and their respective social networking information sharing. The portal or GUI 300 may be a customized dashboard that provides view and information listings according to the preferred settings of each participants' conference call application account.

One view 302 lists the participants by name, another view provides default information about each participant 304. One example would be "title", while other participants may customize their dashboard to display the locations, companies, colleges attended, etc., among other profile information. The information providers which are affiliated with one or more participants are also illustrated for convenience in a sub-window frame 308. The default filters initiated by the moderator may be setup to receive all "ACME" company instances included in each user's profile information and other user information sources, in the window portion 312A.

Referring to the window portion 312A, based on the "ACME" filter setup by the moderator, there were two participants with shared information that included the "ACME" parameter filter. The first participant had a profile entry that may have been on any or more of the participant's profiles including facebook, twitter and/or LinkeIn. The other participant #5 with an "ACME" parameter present in his or her shared information had a blog entry that commented on the corporation and recent news.

Window portion 312B provides another view of personal information gathered by the conference call information sharing application, which includes a common interest among the participants. In this example, 5 out of 6 participants (all except participant #2) had a designated NFL favorite team. The common interest parameter may be setup to find the most relevant parameter to the total number of participants. The common interest parameter by default may attempt to create a category (i.e., "NFL teams") that is based on the relevancy score from the total number of participants. Here, 5 out of 6 or 83% of the participants had a designated favorite national football league (NFL) team.

Figure 3B:
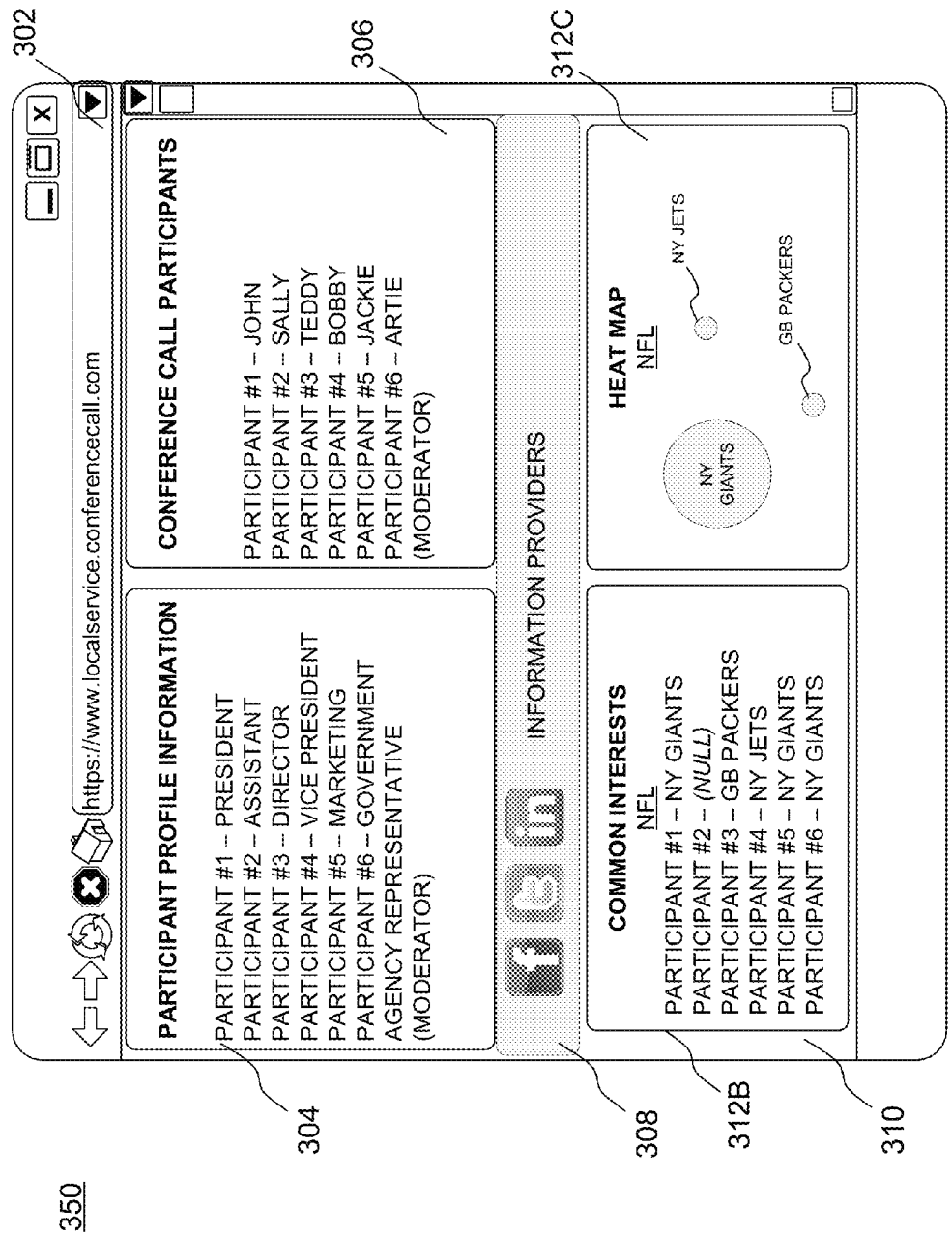
FIG. 3B illustrates another example graphical user interface (GUI) that illustrates a conference call participant's view of a conference call participant information sharing application, according to example embodiments.

FIG. 3B illustrates another example graphical user interface (GUI) that illustrates a conference call participant's view of a conference call participant information sharing application, according to example embodiments. The participants may view a heat map indicating density and other metrics in an analytical approach to understanding the conference call participants. In this example, a detailed visualization is presented of the common interest among the participants. For example, if three conference call participants are fans of the New York (NY) Giants football team, the interest "heat map" will indicate such information, thus suggesting to participants that this topic may be a matter of interest and commonality for everyone. The heat map presented in the window portion 312C illustrates a larger ball or circle to represent the NY Giants than the other two teams, making it a clear choice for a topic discussion whether that team is playing well or not.

Figure 4:
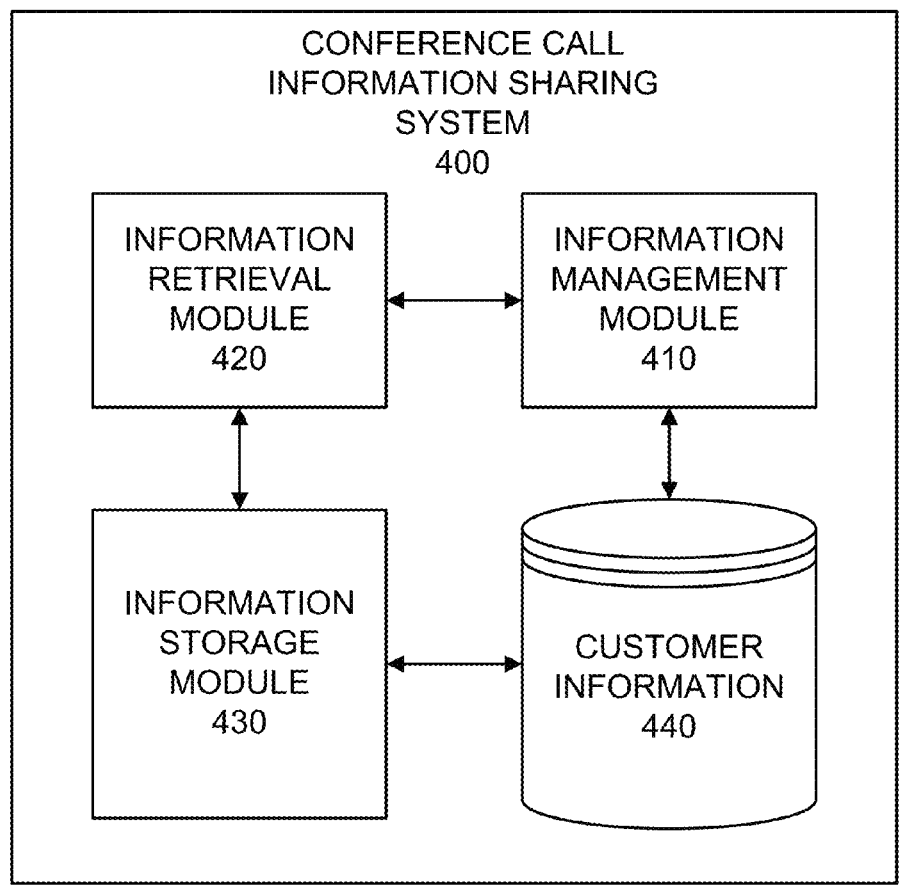
FIG. 4 illustrates an example information sharing system used to perform information sharing during a live conference call, according to example embodiments.

FIG. 4 illustrates an example conference call information sharing system 400 used to perform information sharing during a live conference call, according to example embodiments. Referring to FIG. 4, an example operation of the system 400 may include receiving user credentials to access a user account by an information management module 410. The received user credentials may be compared to pre-stored user credentials stored in customer information database 440 to authenticate the user credentials and permit access to the user account. Next, at least one command may be received from a user or automated operation control application indicating to share at least one social networking application with all persons having access to a scheduled conference call. Information retrieval module 420 may then access an application programming interface (API) of the at least one social networking application and initiate the sharing of user profile information with a graphical user interface (GUI) application of the scheduled conference call corresponding to the command to share the at least one social networking application. All updated changes to the user's account may be stored in the customer information database 440 via the information storage module 430.

Additional operations may provide receiving a command to disallow access to another social network application different from the shared social network application. A user may desire to share information from one third party information source while restricting access to others. The APIs of each of the various social networking sites may be accessed by the system 400 to manage user memberships and their corresponding relationships with the conference call application. The command sent to share the social networking application may permit a portion of the user profile information to be shared and disallows another portion of the user profile from being shared (i.e., sharing work profile information and disallowing personal information). For example, the disallowed portion of the user profile may include media information, such as one or more of photo files, video files and audio files. The shared interest information between the two or more conference call participants during the scheduled conference call may be displayed to include indicia on the graphical user interface (GUI) application of the scheduled conference call to indicate a trend. For example, the trend may be a density indicator corresponding to a number of conference call participants having a same shared interest (see 312C of FIG. 3B). The indicia may include a category and a density indicator that is based one or more conference call participants.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 5 illustrates an example network element 500, which may represent any of the above-described components.

Figure 5:
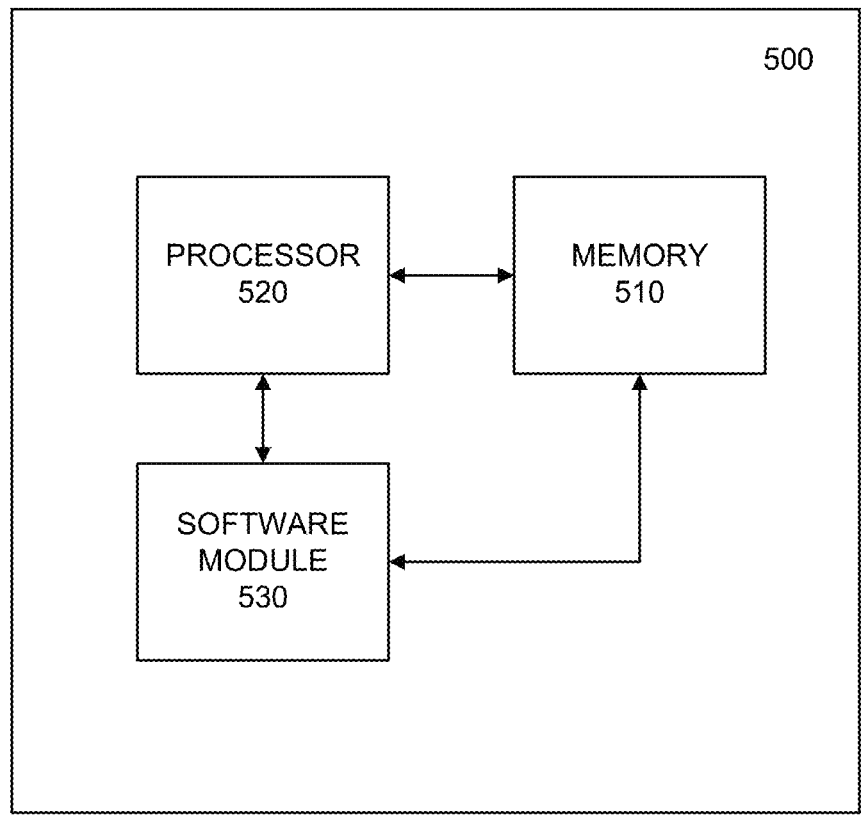
FIG. 5 illustrates a network entity that may include memory, software code and other computer processing hardware used to perform various operations according to example embodiments.

As illustrated in FIG. 5, a memory 510 and a processor 520 may be discrete components of the network entity 500 that are used to execute an application or set of operations. The application may be coded in software in a computer language understood by the processor 520, and stored in a computer readable medium, such as, the memory 510. Furthermore, a software module 530 may be another discrete entity that is part of the network entity 500, and which contains software instructions that may be executed by the processor 520. In addition to the above noted components of the network entity 500, the network entity 500 may also have a transmitter and receiver pair configured to receive and transmit communication signals (not shown).

Figure 6:
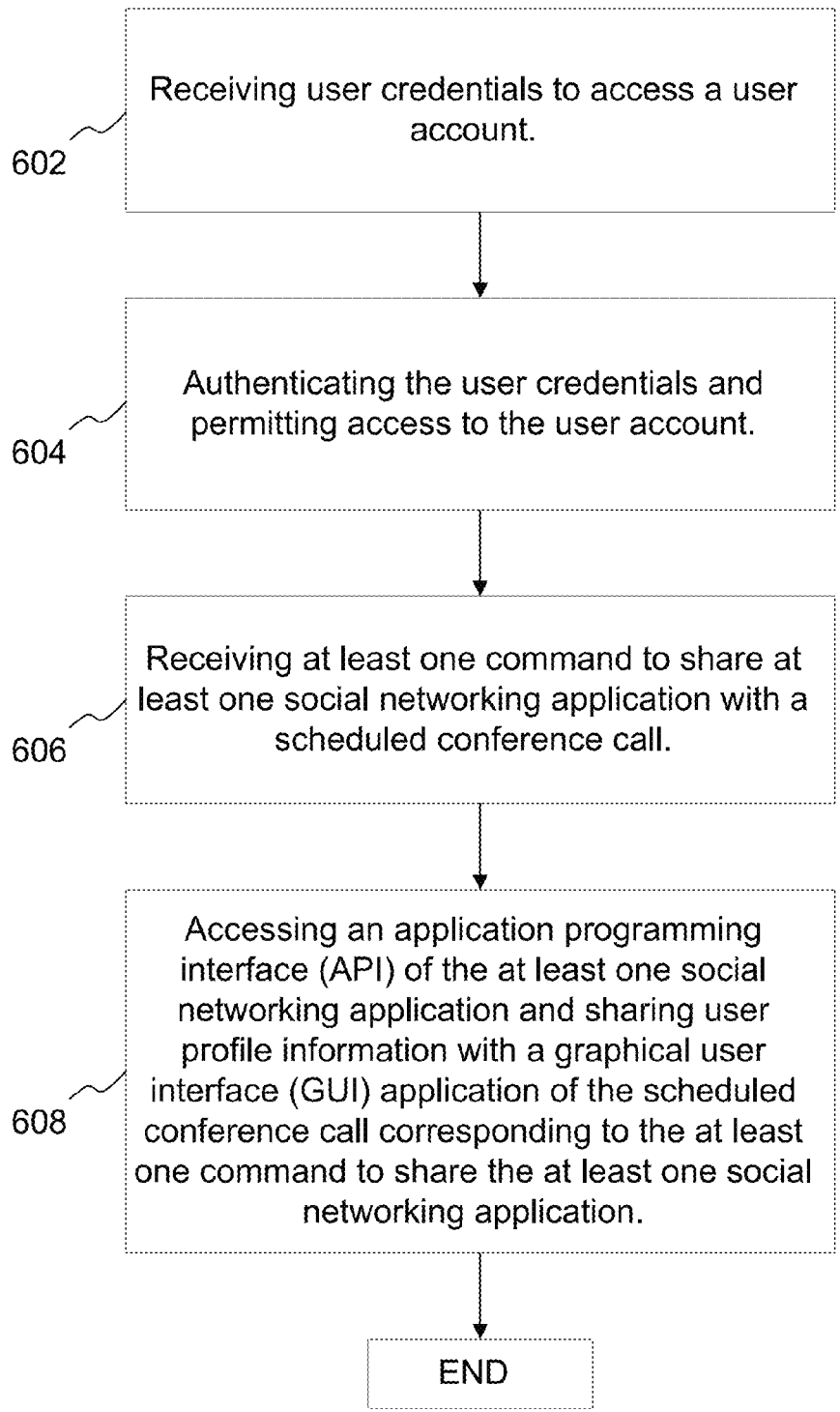
FIG. 6 illustrates a flow diagram of an example method of operation of a conference call information sharing session, according to example embodiments.

FIG. 6 illustrates an example method of operation according to example embodiments. Referring to FIG. 6, the method may provide receiving user credentials to access a user account at operation 602, and authenticating the user credentials and permitting access to the user account at operation 604. The method may also include receiving at least one command to share at least one social networking application with a scheduled conference call at operation 606 and accessing an application programming interface (API) of the at least one social networking application and sharing user profile information with a graphical user interface (GUI) application of the scheduled conference call corresponding to the at least one command to share the at least one social networking application at operation 608.

Although an exemplary embodiment of the system, method, and non-transitory computer readable medium of the present application has been illustrated in the accompanied drawings and described in the foregoing detailed description, it will be understood that the present invention is not limited to the embodiments disclosed, but is capable of numerous rearrangements, modifications, and substitutions without departing from the spirit or scope of the invention as set forth and defined by the following claims. For example, the capabilities of the systems illustrated in FIGS. 1-4 may be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
receiving at least one command to share at least one social networking application with a scheduled conference call;
sharing user profile information with a graphical user interface (GUI) application of the scheduled conference call corresponding to the at least one command to share the at least one social networking application;
identifying shared interest information between two or more conference call participants during the scheduled conference call; and
displaying indicia on the GUI application of the scheduled conference call indicating a trend based on the identified shared interest.

2. The method of claim 1, further comprising receiving a command to disallow access to at least one other social network application different from the shared at least one social network application.

3. The method of claim 1, wherein the at least one command to share the at least one social networking application permits a portion of the user profile information to be shared and disallows at least one other portion of the user profile from being shared.

4. The method of claim 3, wherein the disallowed at least one other portion of the user profile comprises media information comprising at least one of photo files, video files and audio files.

5. The method of claim 1, wherein the trend is a density indicator corresponding to a number of conference call participants having a same shared interest.

6. The method of claim 1, wherein the indicia comprises at least one category and at least one density indicator based on at least one conference call participant.

7. The method of claim 1, comprising accessing an application programming interface (API) of the at least one social networking application.

8. An apparatus comprising:
a receiver; and
a processor configured to:
receive at least one command to share at least one social networking application with a scheduled conference call;

sharing user profile information with a graphical user interface (GUI) application of the scheduled conference call corresponding to the at least one command to share the at least one social networking application;

identify shared interest information between two or more conference call participants during the scheduled conference call; and display indicia on the GUI application of the scheduled conference call indicating a trend based on the identified shared interest.

9. The apparatus of claim 8, wherein the receiver is configured to receive a command to disallow access to at least one other social network application different from the shared at least one social network application.

10. The apparatus of claim 8, wherein the at least one command to share the at least one social networking application permits a portion of the user profile information to be shared and disallows at least one other portion of the user profile from being shared.

11. The apparatus of claim 10, wherein the disallowed at least one other portion of the user profile comprises media information comprising at least one of photo files, video files and audio files.

12. The apparatus of claim 8, wherein the trend is a density indicator corresponding to a number of conference call participants having a same shared interest.

13. The apparatus of claim 8, wherein the indicia comprises at least one category and at least one density indicator based on at least one conference call participant.

14. The apparatus of claim 8, wherein the processor is configured to access an application programming interface (API) of the at least one social networking application.

15. A non-transitory computer readable storage medium comprising instructions that when executed cause a processor to perform:

receiving at least one command to share at least one social networking application with a scheduled conference call;

sharing user profile information with a graphical user interface (GUI) application of the scheduled conference call corresponding to the at least one command to share the at least one social networking application;

identifying shared interest information between two or more conference call participants during the scheduled conference call; and displaying indicia on the GUI application of the scheduled conference call indicating a trend based on the identified shared interest.

16. The non-transitory computer readable storage medium of claim 15, wherein the processor is further configured to perform receiving a command to disallow access to at least one other social network application different from the shared at least one social network application.

17. The non-transitory computer readable storage medium of claim 16, wherein the at least one command to share the at least one social networking application permits a portion of the user profile information to be shared and disallows at least one other portion of the user profile from being shared.

18. The non-transitory computer readable storage medium of claim 17, wherein the disallowed at least one other portion of the user profile comprises media information comprising at least one of photo files, video files and audio files.

19. The non-transitory computer readable storage medium of claim 15, wherein the trend is a density indicator corresponding to a number of conference call participants having a same shared interest, and the indicia comprises at least one category and at least one density indicator based on at least one conference call participant.

20. The non-transitory computer readable storage medium of claim 15, comprising accessing an application programming interface (API) of the at least one social networking application.

* * * * *